US009685127B2

(12) United States Patent
Duan

(10) Patent No.: US 9,685,127 B2
(45) Date of Patent: Jun. 20, 2017

(54) ARRAY SUBSTRATE, METHOD FOR DRIVING ARRAY SUBSTRATE, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Xin Duan, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 0 days.

(21) Appl. No.: 14/100,703

(22) Filed: Dec. 9, 2013

(65) Prior Publication Data

US 2014/0159798 A1 Jun. 12, 2014

(30) Foreign Application Priority Data

Dec. 10, 2012 (CN) .......................... 2012 1 0530822

(51) Int. Cl.
*G06F 3/038* (2013.01)
*G09G 5/00* (2006.01)
*G09G 3/36* (2006.01)

(52) U.S. Cl.
CPC .................................. *G09G 3/3611* (2013.01)

(58) Field of Classification Search
CPC .................................................... G09G 3/3611
USPC ......................................... 327/434, 419, 427
See application file for complete search history.

(56) References Cited

U.S. PATENT DOCUMENTS 5,359,244 A * 10/1994 Hopkins .............. H03K 17/063 327/109
6,707,441 B1 * 3/2004 Hebiguchi ........... G09G 3/3648 345/92
8,860,480 B2 * 10/2014 Vlasenko ................ H02M 1/34 327/157

(Continued)

FOREIGN PATENT DOCUMENTS

CN 101178879 A 5/2008
CN 101707047 A 5/2010

(Continued)

OTHER PUBLICATIONS

Chinese First Office Action Dated May 21, 2014, Application No. 201210530822.1, 6 Pages.

(Continued)

*Primary Examiner* — Kwang-Su Yang
(74) *Attorney, Agent, or Firm* — Brooks Kushman P.C.

(57) ABSTRACT

The present invention provides an array substrate, a driving method and a display device. The array substrate comprises a plurality of gate lines. A first gate line of the two adjacent gate lines is coupled to a first switch unit and a second gate line is coupled to a second switch unit. The first switch unit and the second switch unit are coupled to a control line, and are coupled to a gate drive output channel. The second switch unit is turned off when the first switch unit is turned on under control of the control line, and the first switch unit is turned off when the second switch is turned on under control of the control line. According to the present invention, it is able to effectively reduce the number of the gate drive ICs and thereby to reduce the cost.

9 Claims, 6 Drawing Sheets

(56) References Cited

U.S. PATENT DOCUMENTS

| | | | | |
|---|---|---|---|---|
| 9,019,184 | B2 | 4/2015 | Yamashita et al. | |
| 2001/0015715 | A1 | 8/2001 | Hebiguchi et al. | |
| 2006/0007195 | A1 | 1/2006 | Hu | |
| 2012/0086682 | A1 * | 4/2012 | Shi | G09G 3/3677 345/204 |
| 2012/0249493 | A1 * | 10/2012 | Chiang | G09G 3/3614 345/204 |

FOREIGN PATENT DOCUMENTS

| | | | |
|---|---|---|---|
| CN | 102360542 | A | 2/2012 |
| CN | 102446498 | A | 5/2012 |
| CN | 102713745 | A | 10/2012 |
| KR | 1020020057405 | A | 7/2002 |
| KR | 1020050066720 | A | 6/2005 |
| KR | 1020060076480 | A | 7/2006 |

OTHER PUBLICATIONS

Chinese Second Office Action Dated Jan. 4, 2015, Application No. 201210530822.1, 8 Pages.

Extended European Search Report Dated Feb. 28, 2014, Application No. 13196080.9-1904, Applicant Boe Technology Group Co. Ltd., et al., 8 Pages.

Korean Office Action Dated Sep. 18, 2014, Application No. 10-2013-0142217, Applicant Boe Technology Group Co., Ltd., 5 Pages.

Extended European Search Report Dated Aug. 2, 2016, Application No. 13 196 080.9-1904, Applicant Boe Technology Group Co., Ltd. et al., 6 Pages.

* cited by examiner

ARRAY SUBSTRATE, METHOD FOR DRIVING ARRAY SUBSTRATE, AND DISPLAY DEVICE

CROSS-REFERENCE TO RELATED APPLICATIONS

This application claims priority to Chinese application No. 201210530822.1, filed Dec. 10, 2012, which is hereby incorporated by reference in its entirety.

TECHNICAL FIELD

Embodiments of the present invention relate to a field of liquid crystal display technology, in particular to an array substrate, a driving method and a display device.

BACKGROUND

As shown in FIGS. 1-3, in the drive structure for a traditional liquid crystal panel, each sub-pixel (e.g., sub-pixel R, G or B) corresponds to a source drive line and a gate drive line. The gate drive line transmits, in a row-by-row scanning manner, a threshold voltage to a TFT (Thin Film Transistor) switch in each row, so that a voltage of a corresponding source electrode can be applied to both sides of a liquid crystal.

A high-resolution panel may adopt the traditional single-gate drive structure as shown in FIG. 1, or the dual-gate drive structure as shown in FIG. 2, or the triple-gate drive structure as shown in FIG. 3. As shown in FIGS. 1-3, in such structure, the number of the gate drive lines will be increased remarkably, and the number of the corresponding gate drive ICs (integrated circuits) will be increased too.

SUMMARY

An object of embodiments of the present invention is to provide an array substrate, a driving method, and a display device, so as to reduce the number of gate drive lines, especially for a large-size panel, a dual-gate display panel or a triple-gate display panel.

In one aspect, embodiments of the present invention provide an array substrate, comprising a plurality of gate lines. A first gate line of the two adjacent gate lines is coupled to a first switch unit and a second gate line is coupled to a second switch unit. The first switch unit and the second switch unit are coupled to a control line, and are coupled to a gate drive output channel. The second switch unit is turned off when the first switch unit is turned on under control of the control line, and the first switch unit is turned off when the second switch is turned on under control of the control line.

The first switch unit comprises a first thin film transistor, a gate electrode of the first thin film transistor is coupled to the control line. The second switch unit comprises a NOT gate and a second thin film transistor. An input end of the NOT gate is coupled to the control line and an output end of the NOT gate is coupled to a gate electrode of the second thin film transistor.

Drain electrodes of the first and second thin film transistors are coupled to the gate drive output channel. A source electrode of the first thin film transistor is coupled to the first gate line, and a source electrode of the second thin film transistor is coupled to the second gate line.

The first switch unit comprises a PMOS transistor, and the second switch unit comprises an NMOS transistor. Gate electrodes of the PMOS transistor and the NMOS transistor are coupled to the control line. Source electrodes of the PMOS transistor and the NMOS transistor are coupled to the gate drive output channel. A drain electrode of the PMOS transistor is coupled to the first gate line, and a drain electrode of the NOMS transistor is coupled to the second gate line.

The first and second gate lines are both coupled to a thin film transistor for a sub-pixel of the array substrate. The thin film transistor for the sub-pixel is further coupled to a data line and a pixel electrode of the array substrate.

The same data line is coupled to the thin film transistor for the sub-pixels with the same color, and the two adjacent data lines are coupled to the thin film transistors for the sub-pixels with different colors. The first gate line is coupled to the thin film transistor for a first sub-pixel of the two adjacent sub-pixels with the same color, and the second gate line is coupled to the thin film transistor for a second sub-pixel of the two adjacent sub-pixels with the same color.

The thin film transistors for the two adjacent sub-pixels with different colors are coupled to the same data line. The first gate line is coupled to the thin film transistor for a first sub-pixel of the two adjacent sub-pixels with different colors, and the second gate line is coupled to the thin film transistor for a second sub-pixel of the two adjacent sub-pixels with different colors.

The thin film transistors for the two adjacent sub-pixels with different colors are coupled to the same data line. The first gate line is coupled to the thin film transistor for the sub-pixels with the same color, and is coupled to the thin film transistor for the first sub-pixel of the two adjacent sub-pixels with different colors. The second gate line is coupled to the thin film transistor for the sub-pixels with the same color, and is coupled to the thin transistor for the second sub-pixel of the two adjacent sub-pixels with different colors.

A time sequence for a control signal output to the first switch unit and the second switch unit via the control line is identical to a time sequence for a vertical clock pulse signal. A control signal from the gate drive output channel has a pulse width twice the vertical clock pulse signal.

In another aspect, embodiments of the present invention further provide a method for driving the above-mentioned array substrate, comprising: outputting a voltage signal to a first switch unit and a second switch unit via a control line, so that when the first switch unit is turned on, the second switch unit is turned off and a voltage signal output via a gate drive output channel is applied to a corresponding thin film transistor for a sub-pixel via a first gate line, or when the second switch unit turned on, the first switch unit is turned off and the voltage signal output via the gate drive output channel is applied to a corresponding thin film transistor for a sub-pixel via a second gate line.

A time sequence for the voltage signal output to the first switch unit and the second switch unit via the control line is identical to that of a vertical clock pulse signal, and the voltage signal from the gate drive output channel has a pulse width twice the vertical clock pulse signal.

In yet another aspect, embodiments of the present invention further provide a display device comprising the above-mentioned array substrate.

The present application has the following advantageous effects.

According to embodiments of the present invention, the first gate line of the two adjacent gate lines is coupled to the first switch unit and the second gate line is coupled to the second switch unit. The first switch unit and the second switch unit are coupled to the same control line, and are coupled to the same gate drive output channel. The second switch unit is turned off when the first switch unit is turned on under the control of the control line, and the first switch unit is turned off when the second switch unit is turned on under the control of the control line. As a result, it is able to reduce the number of the gate drive lines by half when maintaining the number of the original source lines, especially for a large-size panel, a dual-gate display panel or a triple-gate display panel.

The present invention will be more clearly understood from the description of preferred embodiments as set forth below, with reference to the accompanying drawings.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

To make the objects, the technical solutions and the advantages of the present invention more apparent, the present invention is described hereinafter in conjunction with the drawings and the embodiments.

Embodiments of the present invention provide an array substrate comprising a plurality of gate lines. A first gate line of the two adjacent gate lines is coupled to a first switch unit, and a second gate line is coupled to a second switch unit. The first switch unit and the second switch unit are coupled to a control line, and are coupled to a gate drive output channel. The second switch unit is turned off when the first switch unit is turned on under the control of the control line, and the first switch unit is turned off when the second switch unit is turned on under the control of the control line.

According to embodiments of the present invention, one control line is used to control the two adjacent gate lines, As a result, it is able to reduce the number of the gate drive lines by half when maintaining the number of the drive lines of the original data lines, especially for a large-size panel, a dual-gate display panel or a triple-gate display panel.

Figure 4:
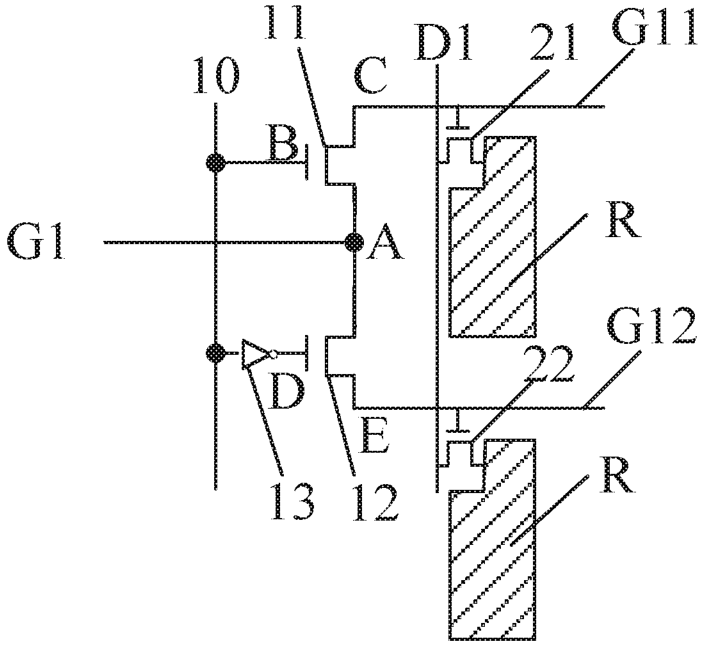
FIG. 4 is a schematic view showing a gate drive circuit for a liquid crystal panel according to a first embodiment of the present invention.

As shown in FIG. 4, in the first embodiment, the first switch unit comprises a first thin film transistor (TFT) 11, and a gate electrode B of the first TFT 11 is coupled to a control line 10.

The second switch unit comprises a NOT gate 13 and a second thin film transistor (TFT) 12. An input end of the NOT gate 13 is coupled to the control line 10, and an output end of the NOT gate 13 is coupled to a gate electrode D of the second TFT 12.

In addition, source electrodes A of the first TFT 11 and the second TFT 12 are coupled to the gate drive output channel G1. A drain electrode C of the first TFT 11 is coupled to the first gate line G11, and a drain electrode E of the second TFT 12 is coupled to the second gate line G12.

In the gate drive circuit with the above-mentioned structure, every two adjacent gate lines G11 and G12 are coupled to the gate drive output channel G1 via two additional TFT switches (i.e., the first TFT 11 and the second TFT 12) respectively, and the two TFT switches control the gate electrodes to be turned on or off via a control signal from the control line.

Figure 5:
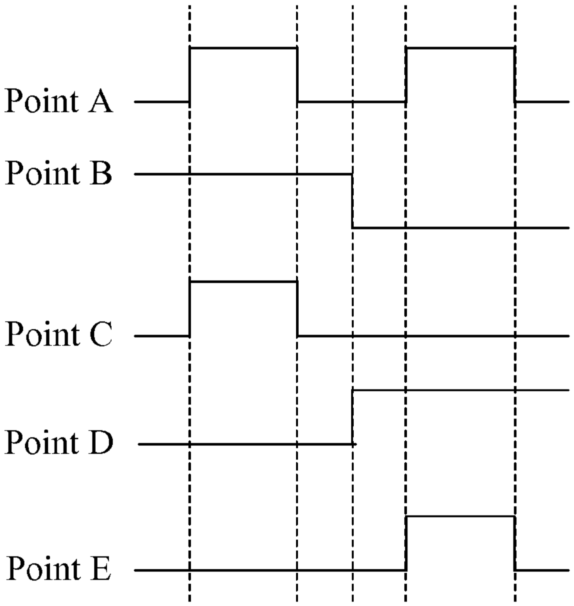
FIG. 5 is a schematic view showing a first control time sequence for the gate drive circuit of the liquid crystal panel of embodiments of the present invention.
Figure 6:
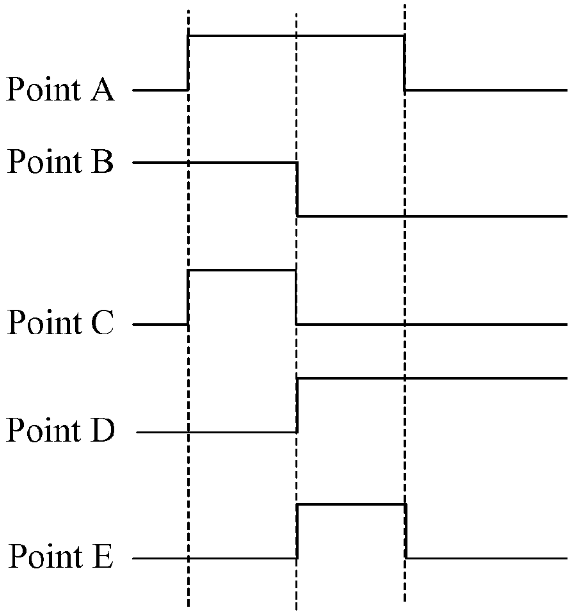
FIG. 6 is a schematic view showing a second control time sequence for the gate drive circuit of the liquid crystal panel of embodiments of the present invention.

Because the sub-pixels corresponding to the two gate lines need to be turned on sequentially, for the time sequence control, an inverted NOT gate circuit is added between the control signal from the control line corresponding to the sub-pixels in the even-numbered rows and the TFT. As a result, it is able to ensure that the sub-pixels corresponding to the two gate lines can be turned on sequentially according to the control signal from the control line, i.e., with the time sequences at points B (i.e., the gate electrode of the first TFT 11) and D (i.e., the gate electrode of the second TFT 12) as shown in FIG. 5 or 6. The time sequence for the control signal from the control line 10 is identical to that at point B.

In the above-mentioned array substrate, the first gate line G11 and the second gate line G12 are coupled to TFTs 21, 22 for sub-pixels (e.g., R, G and B) of the array substrate respectively. Each TFT for the sub-pixel is further coupled to a data line D1 and a pixel electrode of the array substrate.

As shown in FIG. 5, gate drive output signals provided at point A (i.e., source or drain electrodes of the two TFT switches) include two signals for turning on the TFT for the sub-pixel, and the two signals represent the two gate drive lines coupled to the TFT.

When the control signal from the control line 10 is a high level signal, the first TFT 11 added in the odd-numbered rows is turned on, and the signal from the gate drive output channel G1 is applied to the gate electrode of the corresponding TFT 21 for the sub-pixel via the gate line G11. When the control signal from the control line 10 is a low level signal, the second TFT 12 added in the even-numbered rows is turned on due to the function of a phase inverting circuit, and the signal from the gate drive output channel G1 is applied to the TFT 22 for the sub-pixels in the even-numbered rows via the gate line G12. As a result, it is able to control two gate lines by one gate drive output channel.

Figure 7:
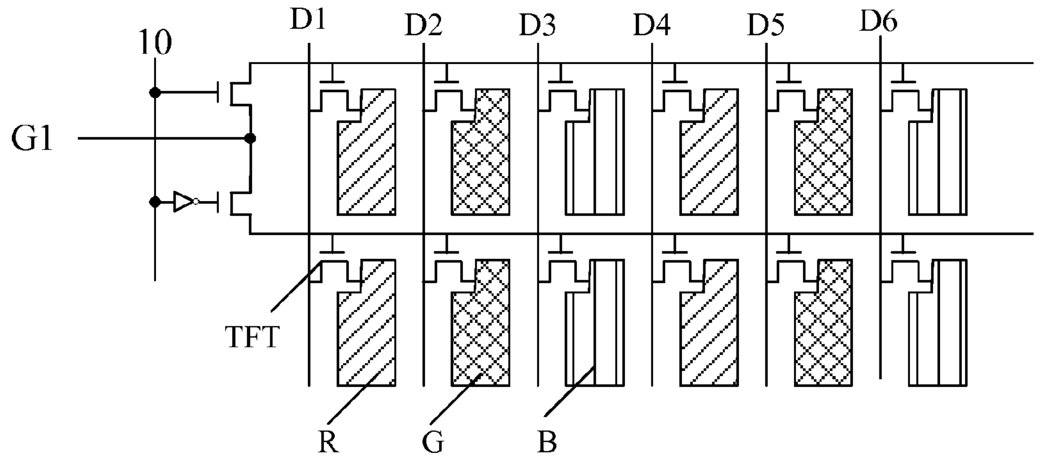
FIG. 7 is a schematic view showing the single-gate drive structure for the liquid crystal panel of embodiments of the present invention.
Figure 8:
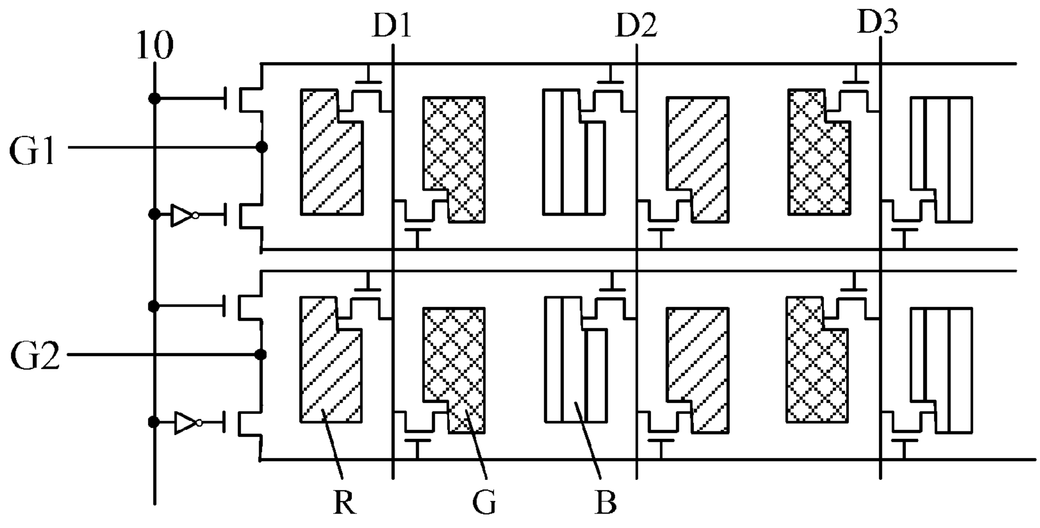
FIG. 8 is a schematic view showing the dual-gate drive structure for the liquid crystal panel of embodiments of the present invention.
Figure 9:
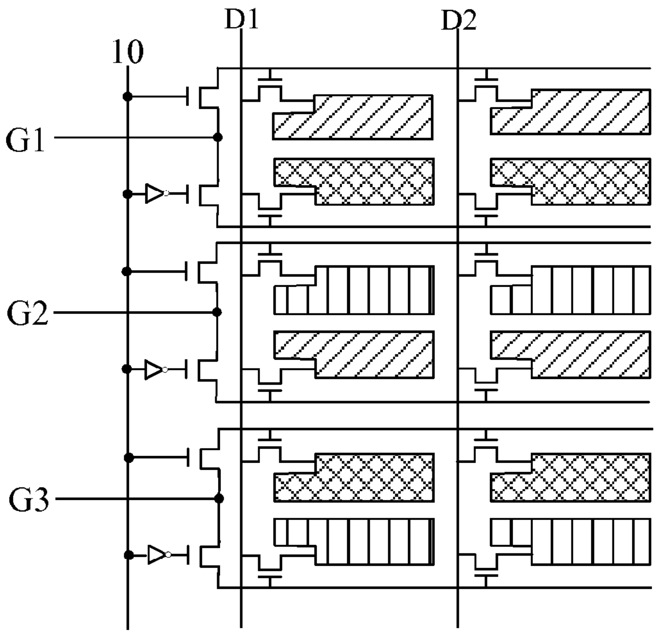
FIG. 9 is a schematic view showing the triple-gate drive structure for the liquid crystal panel of embodiments of the present invention.

By using such structure, the number of the gate drive ICs may be remarkably reduced as compared with the drive structure for a traditional liquid crystal panel, as shown in FIGS. 7, 8 and 9.

As shown in FIG. 7, in the array substrate, the same data line is coupled to the sub-pixels with the same color, and the two adjacent data lines are coupled to the sub-pixels with different colors. The first gate line is coupled to the thin film transistor for a first sub-pixel of the two adjacent sub-pixels with the same color, and the second gate line is coupled to the thin film transistor for a second sub-pixel of the two adjacent sub-pixels with the same color.

As shown in FIG. 8, in the array substrate with the dual-gate drive structure, the same data line is coupled to the sub-pixels with different colors. The first gate line is coupled to the thin film transistor for a first sub-pixel of the two adjacent sub-pixels with different colors, and the second gate line is coupled to the thin film transistor for a second sub-pixel of the two adjacent sub-pixels with different colors.

As shown in FIG. 9, in the array substrate with the triple-gate drive structure, the same data line is coupled to the sub-pixels with different colors. The first gate line is coupled to the sub-pixels with the same color, and is coupled to the thin film transistor for the first sub-pixel of the two adjacent sub-pixels with different colors. The second gate line is coupled to the sub-pixels with the same color, and is coupled to the thin transistor for the second sub-pixel of the two adjacent sub-pixels with different colors.

Figure 1:
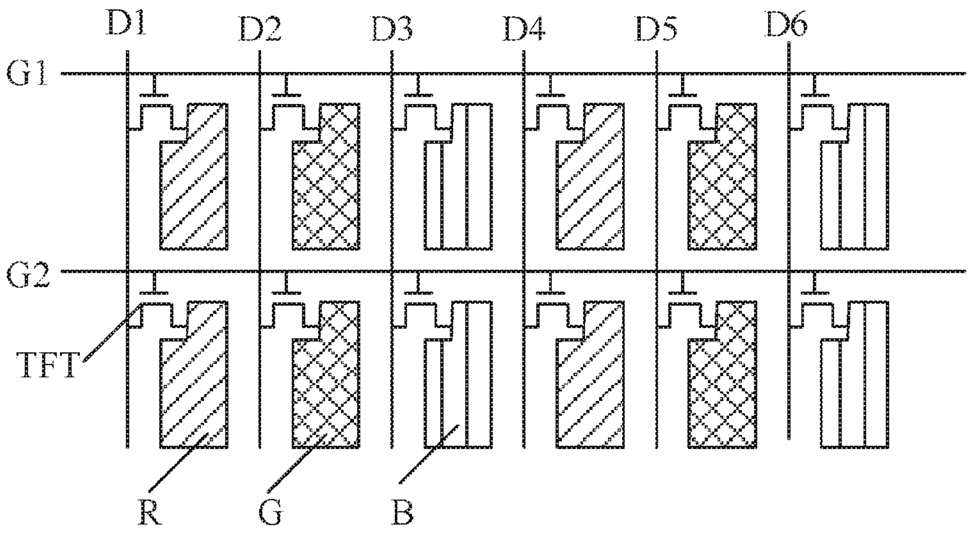
Fig. 1 PRIOR ART
FIG. 1 is a schematic view showing the single-gate drive structure for a traditional liquid crystal panel.
Figure 2:
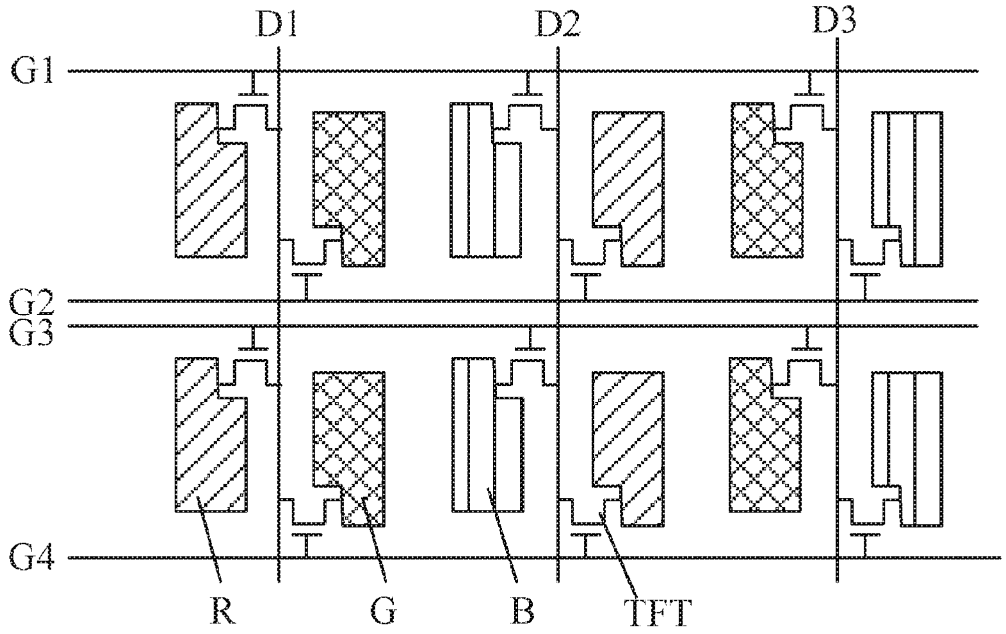
Fig. 2 PRIOR ART
FIG. 2 is a schematic view showing the dual-gate drive structure for a traditional liquid crystal panel.
Figure 3:
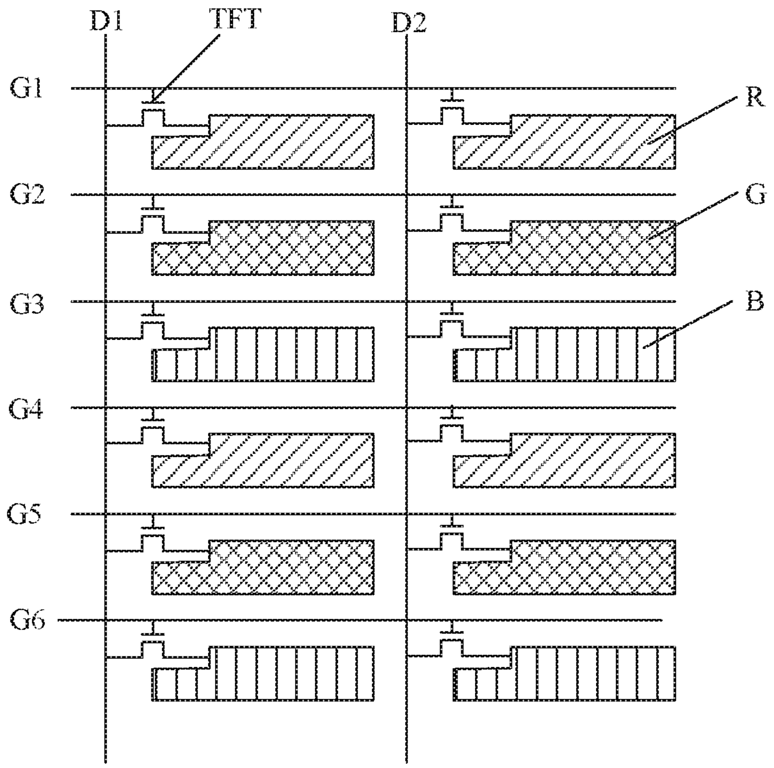
Fig. 3 PRIOR ART
FIG. 3 is a schematic view showing the triple-gate drive structure for a traditional liquid crystal panel.

As compared with FIGS. 1, 2 and 3, the number of the gate drive circuits is reduced by half, without changing the structure of the source drive circuit. As a result, it is able to effectively reduce the number of the gate drive ICs and thereby to reduce the cost.

Figure 10:
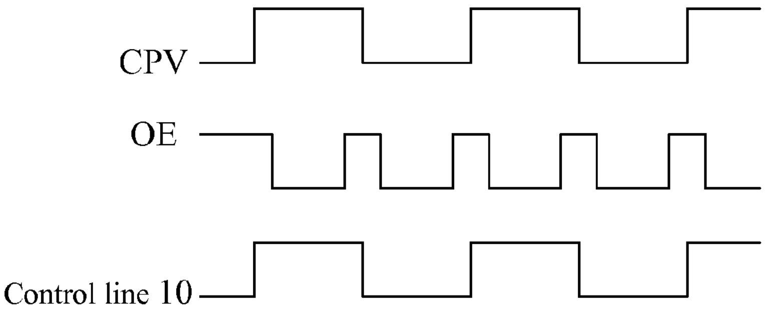
FIG. 10 is a schematic view showing a time sequence for a signal from a control line in the gate drive circuit of embodiments of the present invention.
Figure 11:
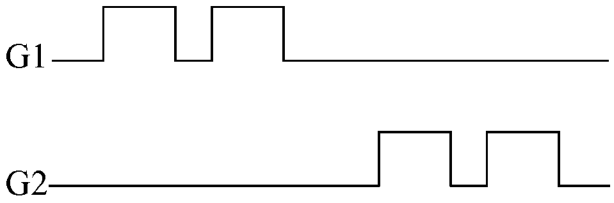
FIG. 11 is a schematic view showing a time sequence for a signal from a gate drive output channel in the gate drive circuit of embodiments of the present invention.
Figure 12:
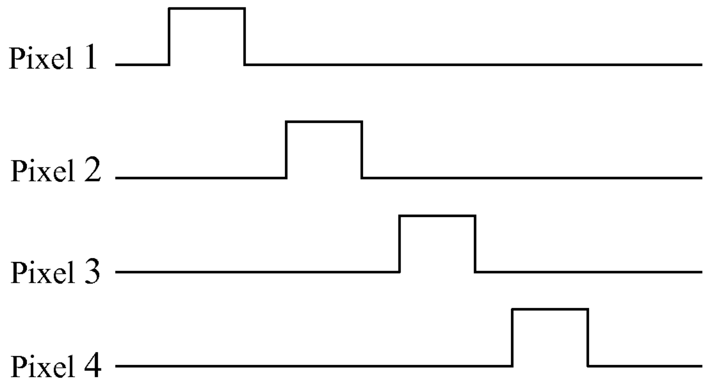
FIG. 12 is a schematic view showing a time sequence for a signal driven by a pixel according to embodiments of the present invention.

Taking 4 rows of pixels as an example, the time sequence for signals from the drive circuit is shown in FIG. 10. The time sequence for a control signal output to the first switch unit and the second switch unit via the control line is identical to a time sequence for a vertical clock pulse signal (CPV signal). CPV signal and OE (output enable) signal are both common gate control signals, and their time sequences may be set in such a manner that the signals from the gate drive output channels G1 and G2 can output a waveform as shown in FIG. 11. The time sequence for the control signal from the newly-added control line is set according to the CPV signal and has a phase totally identical thereto. It merely needs to convert the level of the control signal through a level switch, i.e., to convert the control signal to a voltage signal for turning on the TFTs. When the drive circuit is used together with the original circuit on the array substrate, it is able to achieve the time sequence for the signal driven by the pixels as shown in FIG. 12, thereby to achieve the same effect as the traditional drive circuit.

Of course, the signal from the gate drive output channel G1 may have the time sequence as that of the signal at point A as shown in FIG. 6, and it may have a pulse width twice that of the CPV signal.

To be specific, the original two rows of pixels are controlled as one row of pixels, i.e., the pulse width of the signal at point A is doubled. Two rows of sub-pixels controlled by a signal from an external control line are turned on sequentially, i.e., within a first half of a period, the control signal from the control line is at a high level, and the TFT for the first row of pixels is turned on, while within a second half of the period, the control signal from the control line is converted to be at a low level, and the TFT for the second row of pixels is turned on. As a result, it is also able to reduce the number of the gate drive circuits.

Figure 13:
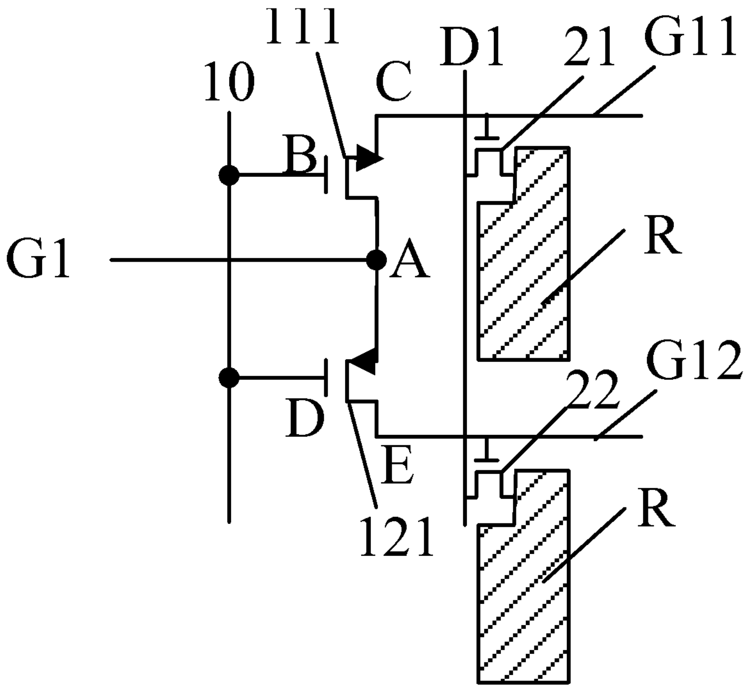
FIG. 13 is a schematic view showing a gate drive circuit for a liquid crystal panel according to a second embodiment of the present invention.

In addition, as shown in FIG. 13, in the second embodiment, the first switch unit comprises a PMOS transistor 111, and the second switch unit comprises an NMOS transistor 121. A gate electrode B of the PMOS transistor 111 is coupled to the control line 10, and a gate electrode D of the NMOS transistor 121 is coupled to the control line 10.

Source electrodes A of the PMOS transistor 111 and the NMOS transistor 121 are coupled to the gate drive output channel G1. A drain electrode C of the PMOS transistor is coupled to the first gate line G11, and a drain electrode E of the NMOS transistor is coupled to the second gate line G12.

According to the drive circuit with such a structure, based on the control line, both PMOS transistor and NMOS transistor are used, where the PMOS transistor is located above and the NMOS transistor is located below. When the other rows are turned on, the source electrode at point A is at a low level, which is the same as the gate drive level of the TFT for the sub-pixels, and the operating state thereof will not be affected by the control signal from the control line. When the current line needs to be turned on, a signal at a high level will be output by point A. When the control signal from the control line is at a high level, the PMOS transistor will be turned on, and a threshold voltage at point A will be applied to point C to drive the TFTs for the first row of sub-pixels to be turned on. If the control signal from the control line is at a low level, the PMOS transistor will be turned off and the NMOS transistor is turned on, and the threshold voltage will be applied to point E to drive the TFTs for the second row of sub-pixels to be turned on. According to this drive circuit, the original circuit design is simplified, and the same effect as the first embodiment will be achieved.

Embodiments of the present invention further provide a method for driving the abovementioned array substrate, comprising: outputting a voltage signal to a first switch unit and a second switch unit via a control line, so that when the first switch unit is turned on, the second switch unit is turned off, and a voltage signal output by a gate drive output channel is applied to a corresponding thin film transistor for a sub-pixel via a first gate line, or when the second switch unit turned on, the first switch unit is turned off, and the voltage signal output by the gate drive output channel is applied to a corresponding thin film transistor for a sub-pixel via a second gate line.

A time sequence of the control signal output to the first switch unit and the second switch unit via the control line is identical to that of a vertical clock pulse signal, and the signal from the gate drive output channel has a pulse width twice the CPV signal.

Embodiments of the present invention further provide a display device comprising the abovementioned array substrate. The array substrate may those as shown in FIG. 7, 8 or 9, or any other array substrate with a larger size and a higher resolution.

The above are merely the preferred embodiments of the present invention. It should be noted that, a person skilled in the art may further make improvements and modifications without departing from the principle of the present invention, and these improvements and modifications shall also be considered as the scope of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An array substrate, comprising a plurality of gate lines, wherein a first gate line of the two adjacent gate lines is coupled to a first switch unit and a second gate line is coupled to a second switch unit; and the first switch unit and the second switch unit are coupled to a control line, and are coupled to a gate drive output channel, wherein the second switch unit is turned off when the first switch unit is turned on under control of the control line; and the first switch unit is turned off when the second switch is turned on under control of the control line, wherein the first and second gate lines are coupled to thin film transistors for sub-pixels of the array substrate, respectively, and the thin film transistors for the sub-pixels are further coupled to a data line and pixel electrodes of the array substrate, respectively;

the same data line is coupled to the thin film transistor for the sub-pixels with the same color, and the two adjacent data lines are coupled to the thin film transistors for the sub-pixels with different colors; and the first gate line is coupled to the thin film transistor for a first sub-pixel of the two adjacent sub-pixels with the same color, and the second gate line is coupled to the thin film transistor for a second sub-pixel of the two adjacent sub-pixels with the same color, wherein the first switch unit is a first thin film transistor, a gate electrode of the first thin film transistor is coupled to the control line, and the source electrode of the first thin film transistor is coupled to the gate electrode of the thin film transistor for the first sub-pixel; and the second switch unit consists of a NOT gate and a second thin film transistor, an input end of the NOT gate is coupled to the control line, an output end of the NOT gate is coupled to a gate electrode of the second thin film transistor, and the source electrode of the second thin film transistor is coupled to the gate electrode of the thin film transistor for the second sub-pixel, and wherein both a drain electrode of the first thin film transistor and a drain electrode of the second thin film transistor are coupled to the gate drive output channel; and the source electrode of the first thin film transistor is coupled to the first gate line, and the source electrode of the second thin film transistor is coupled to the second gate line.

2. The array substrate according to claim 1, wherein drain electrodes of the first and second thin film transistors are coupled to the gate drive output channel;

a source electrode of the first thin film transistor is coupled to the first gate line; and a source electrode of the second thin film transistor is coupled to the second gate line.

3. The array substrate according to claim 2, wherein the first and second gate lines are both coupled to a thin film transistor for a sub-pixel of the array substrate; and the thin film transistor for the sub-pixel is further coupled to a data line and a pixel electrode of the array substrate.

4. The array substrate according to claim 1, wherein a time sequence for a control signal output to the first switch unit and the second switch unit via the control line is identical to a time sequence for a vertical clock pulse signal.

5. The array substrate according to claim 4, wherein a signal from the gate drive output channel has a pulse width twice the vertical clock pulse signal.

6. A display device comprising the array substrate according to claim 1.

7. A method for driving an array substrate, the array substrate comprising a plurality of gate lines, wherein a first gate line of the two adjacent gate lines is coupled to a first switch unit and a second gate line is coupled to a second switch unit; and the first switch unit and the second switch unit are coupled to a control line, and are coupled to a gate drive output channel, wherein the second switch unit is turned off when the first switch unit is turned on under control of the control line; and the first switch unit is turned off when the second switch is turned on under control of the control line wherein the first and second gate lines are coupled to thin film transistors for sub-pixels of the array substrate, respectively, and the thin film transistors for the sub-pixels are further coupled to a data line and pixel electrodes of the array substrate, respectively;

the same data line is coupled to the thin film transistor for the sub-pixels with the same color, and the two adjacent data lines are coupled to the thin film transistors for the sub-pixels with different colors; and the first gate line is coupled to the thin film transistor for a first sub-pixel of the two adjacent sub-pixels with the same color, and the second gate line is coupled to the thin film transistor for a second sub-pixel of the two adjacent sub-pixels with the same color, wherein the first switch unit is a first thin film transistor, a gate electrode of the first thin film transistor is coupled to the control line, and the source electrode of the first thin film transistor is coupled to the gate electrode of the thin film transistor for the first sub-pixel; and the second switch unit consists of a NOT gate and a second thin film transistor, an input end of the NOT gate is coupled to the control line, an output end of the NOT gate is coupled to a gate electrode of the second thin film transistor, and the source electrode of the second thin film transistor is coupled to the gate electrode of the thin film transistor for the second sub-pixel, and wherein both a drain electrode of the first thin film transistor and a drain electrode of the second film transistor are coupled to the gate drive output channels; and the source electrode of the first thin film transistor is coupled to the first gate line, and the source electrode of the second thin film transistor is coupled to the second gate line, the method comprising:

outputting a voltage signal to the first switch unit and the second switch unit via the control line, so that when the first switch unit is turned on, the second switch unit is turned off and a voltage signal output via the gate drive output channel is applied to a corresponding thin film transistor for a sub-pixel via the first gate line, or when the second switch unit turned on, the first switch unit is turned off and the voltage signal output via the gate drive output channel is applied to a corresponding thin film transistor for a sub-pixel via the second gate line.

8. The method according to claim 7, wherein a time sequence for the voltage signal output to the first switch unit and the second switch unit via the control line is identical to that of a vertical clock pulse signal.

9. The method according to claim 8, wherein the voltage signal from the gate drive output channel has a pulse width twice the vertical clock pulse signal.

* * * * *